United States Patent
Ivan et al.

(10) Patent No.: US 10,852,703 B2
(45) Date of Patent: Dec. 1, 2020

(54) AGGREGATED POINT-SOLUTION MAPPING

(71) Applicant: Toyota Motor Engineering & Manufacturing North America, Inc., Erlanger, KY (US)

(72) Inventors: Roger Ivan, Waterloo (CA); Shubhendu Tripathi, Kitchener (CA)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 171 days.

(21) Appl. No.: 15/687,044

(22) Filed: Aug. 25, 2017

(65) Prior Publication Data
US 2019/0064760 A1    Feb. 28, 2019

(51) Int. Cl.
  *G05B 19/04*     (2006.01)
  *G05B 19/042*    (2006.01)
(52) U.S. Cl.
  CPC ......... *G05B 19/041* (2013.01); *G05B 19/042* (2013.01); *G05B 2219/23008* (2013.01)
(58) Field of Classification Search
  USPC .......................................................... 700/86
  See application file for complete search history.

(56) References Cited

U.S. PATENT DOCUMENTS

| | | | |
|---|---|---|---|
| 4,958,292 A | 9/1990 | Kaneko et al. | |
| 5,255,197 A | 10/1993 | Iida | |
| 8,886,924 B1 * | 11/2014 | Ly | H04L 63/029 713/150 |
| 8,930,305 B2 | 1/2015 | Namburu et al. | |
| 9,110,969 B2 | 8/2015 | Li et al. | |
| 2009/0138315 A1 * | 5/2009 | Schroeder | G06Q 10/06 705/12 |
| 2011/0172879 A1 | 7/2011 | Abe | |
| 2017/0075340 A1 | 3/2017 | Claeys | |

FOREIGN PATENT DOCUMENTS

JP          06208690 A   *   7/1994

OTHER PUBLICATIONS

All about Andon, Allaboutlean.com Nov. 2015; Retrieved from https://www.allaboutlean.com/andon/ on Apr. 14, 2019 (Year: 2015).*

* cited by examiner

*Primary Examiner* — Mohammad Ali
*Assistant Examiner* — Joshua T Sanders
(74) *Attorney, Agent, or Firm* — Christopher G. Darrow; Darrow Mustafa PC

(57) ABSTRACT

A method and device for aggregate point-solution mapping is disclosed. The aggregate point-solution mapping includes accessing a plurality of system data types for an assembly operation. For each of the plurality of system data types, a functional location is determined that relates to the assembly operation, and correlating the functional location to a layout mapping for the assembly operation. Each of the plurality of system data types are compared with a respective data type threshold to produce a status result. Upon an unfavorable comparison, visual indicator data is generated for the status result, and presented for display via the layout mapping at the functional location.

17 Claims, 5 Drawing Sheets device 100

AGGREGATED POINT-SOLUTION MAPPING

FIELD

The subject matter described herein relates in general to point solution devices and, more particularly, to the aggregated-point solutions as relating to a layout mapping of product assembly and/or manufacture operation.

BACKGROUND

Assembly operations have generally had various metrics relating to the function and efficiency of a product build. In this respect, various different metric systems have been developed over time relating to various processes that may delay or otherwise affect product manufacture. For example, metrics may include aspects such as quality control, equipment maintenance, personnel attendance, etc.

Each of these metrics have generally been used to provide point solutions, that is, resolving one particular problem without regard to other issues that may otherwise be related. However, no interrelationship between the different metrics could be discerned as they relate to the operation, and to other issues that may otherwise be related. Accordingly, though multiple point solution may exist, none of the point solutions may interrelate to define and/or identify a generalized problem area as it relates to positions and/or coordinates of an assembly operation.

As a result, an interrelationship between different point solutions is desired to as relating to an assembly operation that may have numerous different systems and associated data without altering the data structures that may underlie the point solution.

SUMMARY

A device and method for aggregated point-solution mapping, related to an assembly operation, are disclosed.

In one implementation, a method for aggregate point-solution mapping is disclosed. The method includes accessing a plurality of system data types for an assembly operation. For each of the plurality of system data types, determining a functional location that relates to the assembly operation, and correlating the functional location to a layout mapping for the assembly operation. Each of the plurality of system data types are compared with a respective data type threshold to produce a status result. When the status result indicates an unfavorable comparison, generating visual indicator data for the status result, and presenting the visual indicator data for display via the layout mapping at the functional location.

In another implementation, device for aggregated point-solution mapping includes a communication interface, a processor, and a memory. The communication interface is operable to service communication with a network. The processor is communicably coupled to the communication interface, and the memory is coupled to the processor, and stores a functional location module including instructions that, when executed by the processor, cause the processor to access a plurality of system data types relating to an assembly operation. For each of the plurality of system data types, instructions of the functional location module, when executed by the processor, cause the processor to determine a functional location that relates to the assembly operation, and to correlate the functional location to a layout mapping for the assembly operation. The memory further stores an aggregated point solution module including instructions that, when executed by the processor, cause the processor to compare the each of the plurality of system data types with a respective system data type threshold to produce a status result, and when the status result indicates an unfavorable comparison, generate visual indicator data for the status result, and present the visual indicator data for display via the layout mapping at the functional location.

BRIEF DESCRIPTION OF THE DRAWINGS

The description makes reference to the accompanying drawings wherein like reference numerals refer to like parts throughout the several views, and wherein.

DETAILED DESCRIPTION

An aggregated point-solution mapping method and device for an assembly operation are described here. An example method provides for traversing a multiple data sets relating to point solutions to identify the most granular "functional" location available for an aggregated point-solution mapping of the assembly operation.

As may be appreciated, to conventionally generate an interrelationship between different data sets (or databases), a primary key field would have had to been added to each of the existing point solutions. For example, a quality system tracks defects, but has no tie into the financial system. To provide an interrelationship between the databases, a "Cost Center" field would have had to be added to the quality system to link to the financial system (that is, "Cost Center" would he considered a key field on the financial system). Providing an interrelationship in this manner is cumbersome and complex, because each of the point solution systems would also need to he linked (or interrelated) to the financials system, requiring data structure updates to each data set and/or databases for the assembly process.

To provide interrelationship between point solution databases, a "functional location" tree may be used to interrelate point solutions with respect to the assembly and/or industry operation, without changing or modifying (that is, by adding a primary key field) the underlying data structures. Accordingly, the method and device described herein may traverse the functional location tree and obtain the most (or finest) granular location level available with respect to each of the point solutions (that is, the process abnormalities that may arise) for the assembly operation.

As may be appreciated, the method and device described herein may be executed, or ran, as a scheduled job referencing the respective functional locations. The method and device described herein may, based on the scheduled job, update the visual indicator data for an aggregated point-solutions mapping at the respective functional locations.

Figure 1:
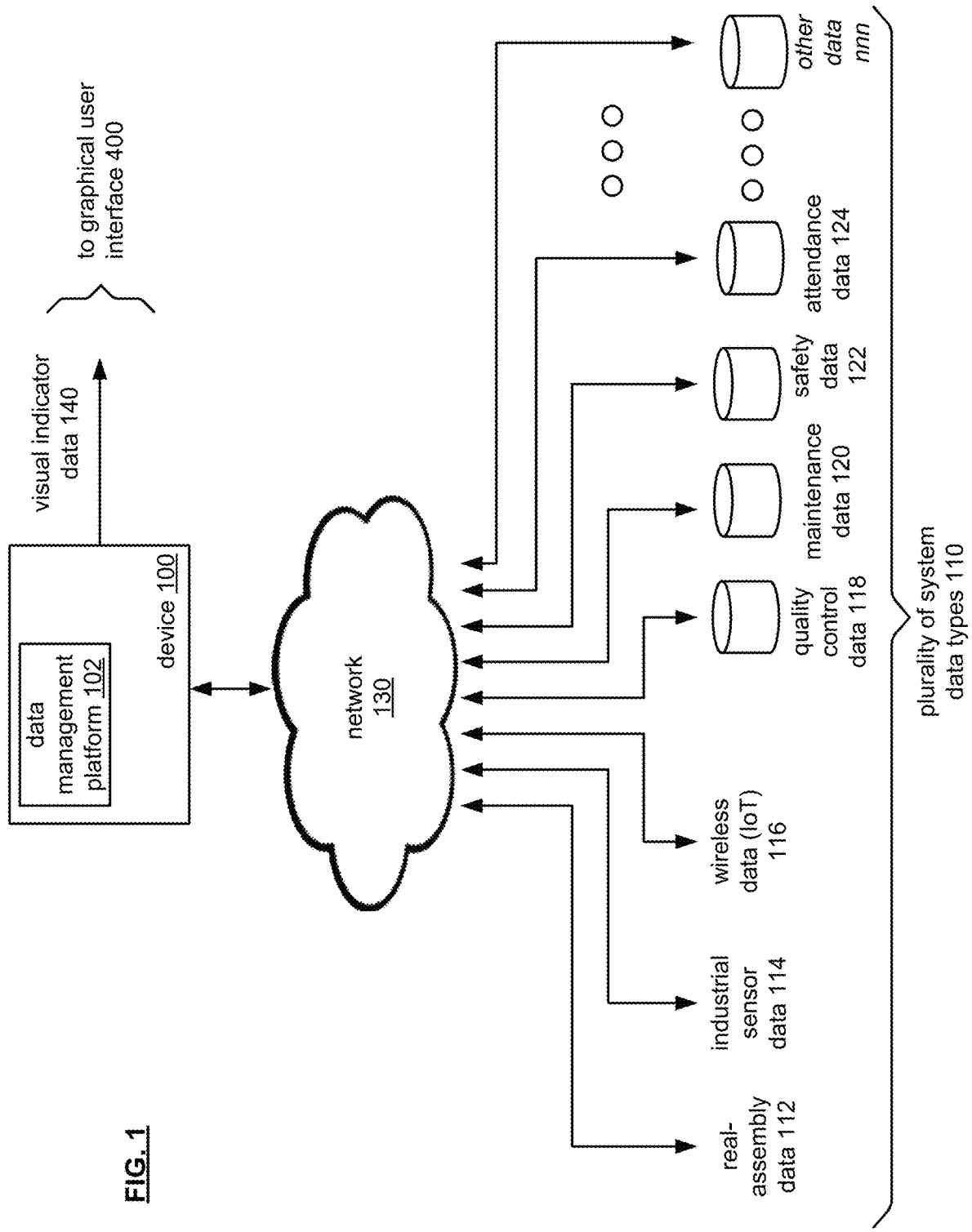
FIG. 1 illustrates a block diagram of a device coupled to a plurality of system data types.

FIG. 1 illustrates a block diagram of a device 100 coupled to a plurality of system data types 110. The system data types 110 may include wireless and wired data sources relating to an operation.

System data types 110 may include real-time assembly data 112, industrial sensor data 114 and wireless data (Internet-of-Things (IoT)) 116. System data types 110, 112 and 114 may include real-time (or near real-time) data (such as real-time assembly line data) by sensors devices monitoring an assembly and/or industry operation. Data metrics relating to the assembly and/or industry operation may include quality control data 118, maintenance data 120, safety data 120, attendance data 124, and other data nnn.

The system data types 110 may be directly and/or indirectly coupled to the device 100 via a network 130. The device 100 may include a data management platform 102 for processing real-time (or near real-time) analytics relating to the respective system data types 110 to produce individual point solutions based on each of the data 112 through nnn. The data management platform 102 may function as database server to store and retrieve data via the system data types 110 as set out by the device 100. Generally, the data management platform may operate to perform advanced analytics (predictive analytics, spatial data processing, text analytics, text search, streaming analytics, graph data processing, etc.) and may also include ETL (Extract, Transform and Load) capabilities, as well as providing functionality as an application server. Examples of such data management platforms may include MySQL, PostgreSQL, MongoDB, MariaDB, Microsoft SQL Server, Oracle, Sybase, SAP HANA, MemSQL, SQLite, IBM DB2, etc.

In operation, the device 100 may operate to access the plurality of system data types 112, 114, 115, 118, 120, 122, 124 through nnn for an assembly operation. An example of an assembly operation may include automotive parts assembly, automobile assembly, electronics device assembly, etc. As may be appreciated, each of the plurality of system data types 110 may differ from one another and include varying database structures with respect to one another.

The device 100 may operate, for each of the plurality of system data types 110, determine a functional location that relates to the assembly operation, and correlate the functional location to a layout mapping for the assembly operation.

The functional location with respect to each of the system data types 110 may be at varying levels of granularity (that is, from a higher level of granularity (finest level), such as may provided via inventory location data and/or field, to a lower level of granularity, such as may be provided by a cost center data and/or field (coarsest level)). Granularity decreases from an inventory location data, to equipment process location data, to sub-area location data, to sub-zone location data, to zone location data, and a lowest granularity level at the cost center data. As may be appreciated, functional location methodologies may be tailored to respective assembly operation.

In further operation, the device 100 may operate to compare each of the plurality of system data types with a respective system data type threshold to produce a status result. The status result, when indicating an unfavorable comparison with the respective system data type threshold, generates visual indicator data 140 for the status result. As may be appreciated, in isolation, the status result corresponds to a point solution for the assembly operation.

For visual confirmation, the visual indicator display 140 may be displayed via a layout mapping of the assembly operation through a graphical user interface 400. The visual indicator data 140 may be displayed via the graphical user interface 400 at the functional location determined at a highest location granularity level available for that system data type 110 (that is, functional location from an inventory location data level, to an equipment process location data level, to a sub-area location data level, to a sub-zone location data level, to a zone location data level, and to a cost center data level), as is discussed in detail with reference to FIGS. 2-5.

In this manner, interrelationships between point solution databases for the system data types 110 may be based on respective functional locations by searching "functional location" trees to interrelate respective point solutions with respect to the product assembly and/or manufacturing process, without changing or modifying the underlying data structures for the system data types 110. For functional location, the device 100 may retrieve a functional location tree respective to the each of the plurality of system data types 110. In some instances, functional locations may not be updated for each of the system data types 110, as well as for each element of the system data types 110. In this respect, the "functional location" tree among various system data types 110 may be used to determine a functional location being relative to a location granularity level having a greater (or finer) granularity value with respect to the plurality of location granularity values. That is, the functional location for a first functional location tree may be co-located with a second functional location tree.

Figure 2:
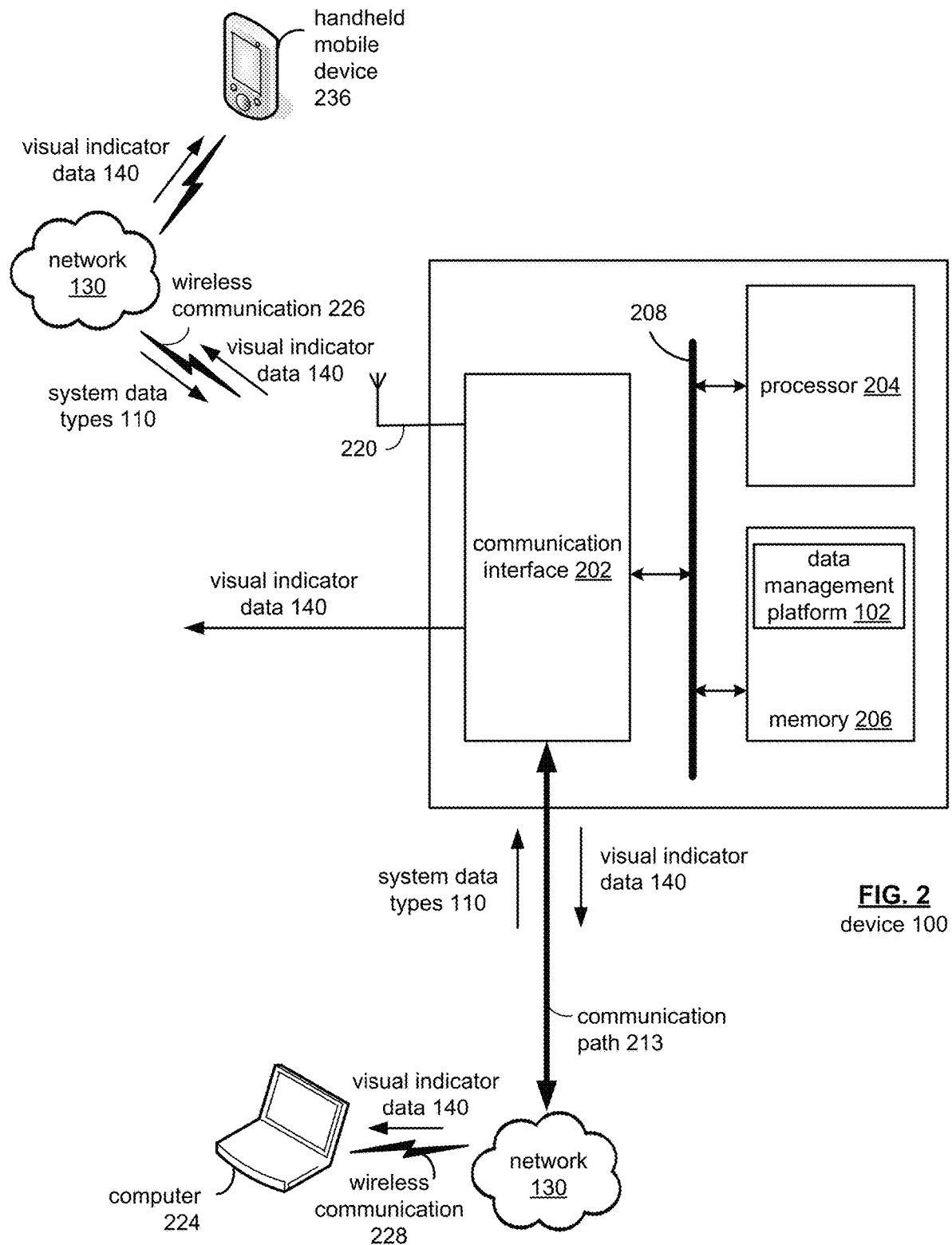
FIG. 2 illustrates a block diagram of the device of FIG. 1.

FIG. 2 illustrates a block diagram of a device 100, which may include a communication interface 202, a processor 204, and memory 206, which are communicatively coupled via a bus 208.

The processor 204 of the device 100 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information.

The memory 206 is capable of storing machine readable instructions such that the machine readable instructions can be accessed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP), scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

The data management platform 102 may be resident remotely or locally with the memory 206 to provide analytic functionality for the device 100. The data management platform 102 may operate for processing real-time (or near real-time) analytics relating to the respective system data types 110 to produce individual point solutions based on each of the data 112 through nnn (FIG. 1). For example, the data management platform 102 may be an in-memory (such as memory 206, or memory resident with the processor 204) relational, column-oriented database management system operable to function as database server to store and retrieve data as requested by the methods as described in detail with reference to FIGS. 1-5.

Note that when the processor 204 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory 206 stores, and the processor 204 executes, hard coded and/or operational instructions corresponding to at least some of the steps and/or functions illustrated in FIGS. 1-5 for aggregated-point solutions relating to an assembly operation.

The communication interface 202 generally governs and manages the input data via the network 130 over the communication path 213 and/or wireless communication 226. The communication interface 202 also manages device output data such as the visual indicator data 140, and also manages control unit input data, such as system data types 110 There is no restriction on the present disclosure operating on any particular hardware arrangement and therefore the basic features herein may be substituted, removed, added to, or otherwise modified for improved hardware and/or firmware arrangements as they may develop.

The network 130 may be communicatively coupled to receive signals from the system data types 110, such as via the antenna 220 of the device 100, or other such antenna (not shown). The antenna 220 may include one or more conductive elements that interact with electromagnetic signals transmitted via network 130. The received signals may be transformed into a data signal indicative of the system data types 110.

The wireless communication 226 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, Zig-Bee, and/or variations thereof.

The device 100 may be communicatively coupled to a computer 224 via communication path 213 and wireless communication 228, or to a handheld mobile device 236 via wireless communication 226 and/or other wireless communication. Displays of the computer 224 and/or the handheld mobile device 236 may include a graphical user interface 400 (FIG. 1) for visual confirmation. That is, the visual indicator data 140 may be displayed via a layout mapping of the assembly operation through the graphical user interface 400. The visual indicator data 140 may be displayed via the graphical user interface 400 at a representative functional location determined at a highest location granularity available for that system data type 110 (that is, functional location from an inventory location data level, to an equipment process location data level, to a sub-area location data level, to a sub-zone location data level, to a zone location data level, and to a cost center data level).

For example, system data types 110 may be received and analyzed by the device 100 via the data management platform 102. Point solutions, in an aggregated manner, may be provided as visual indicator data 140. The visual indicator data 140 may be presented to a user via a graphical user interface of a layout mapping for an assembly operation, as is described in detail with reference to FIGS. 3-5.

Figure 3:
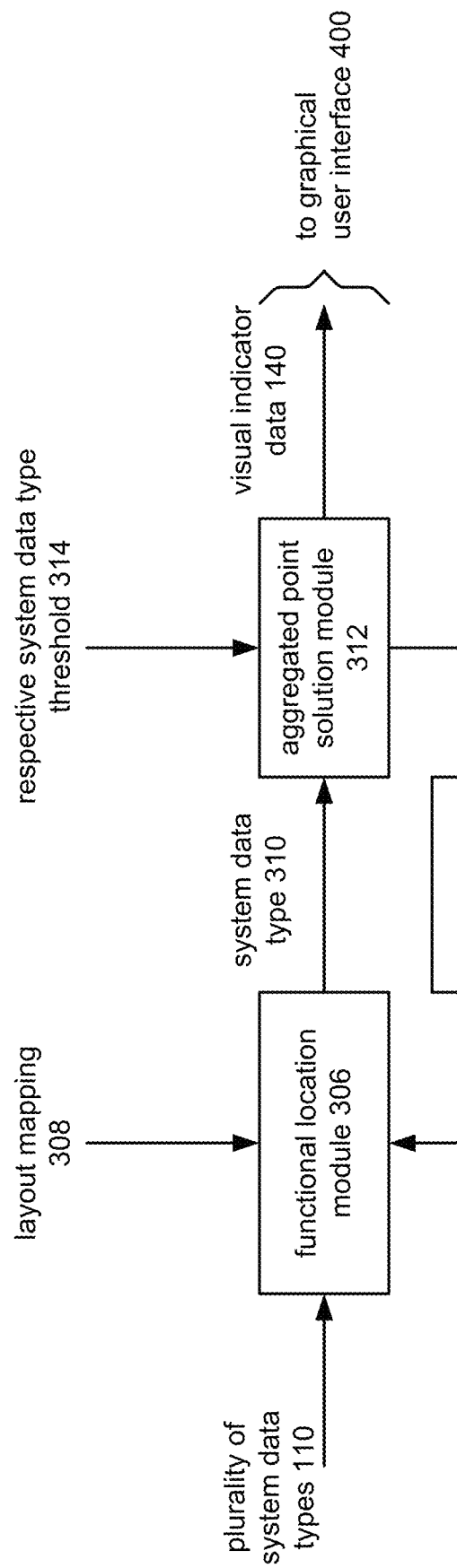
FIG. 3 illustrates a functional block diagram of the device of FIG. 1 for providing an aggregated point-solution mapping for an assembly operation.

FIG. 3 illustrates a functional block diagram of the device 100 for providing an aggregated point-solution mapping for an assembly operation. Referring back to FIG. 2, the device 100 may include processor 204 and memory 206. The memory 206 may store a functional location module 306 and an aggregated point-solution module 312.

The functional location module 306 may include instructions that, when executed by the processor 204, cause the processor 204 to access a plurality of system data types 110 relating to an assembly operation. As may be appreciated, each of the plurality of system data types 110 may be different from one another.

The functional location module 306, when executed by the processor 204, for each of the plurality of system data types 110 as represented by the counter 316, further causes the processor 204 to determine a functional location for the plurality of system data types 110, which in turn may relate to the assembly operation. As may be appreciated, a "functional location" tree may be developed relating to the plurality of system data types 110. The "functional location" tree may be understood to be a tree data structure to locate specific relational database keys from within a data set, such as the functional location.

An advantage of a search tree is search efficiency given the tree is reasonably balanced. That is, the "leaves," at either end of the tree branches are comparable depths or granularity. The "leaves" of the search relate to the granularity of the functional location, such as fine functional location granularity progressing at an inventory location level, to a coarse functional location granularity at a cost center level.

In this respect, the functional location module 306 may traverse the functional location tree and obtain the most granular location available from the respective data of the system data types 110.

Functional location data may be determined for one of the system data types 110 by searching other system data types 110. For example, financial inventory may track some but not all assets of an assembly operation. More than half of equipment may not have an asset designation, and accordingly, a physical location designation may be designated. Also, a cost center level may be overly broad—that is, insufficient granularity to determine a functional location.

Accordingly, each of the system level data 110 may have a related functional location tree. For example, in a functional location tree for vehicle maintenance data may include a zone level labeled "MTC-ASSY-TRIM1", each zone level including an equipment process level labeled "Equipment1, Equipment2, Equipment 3, etc.", and each of the equipment process levels including an inventory (or asset) level labeled "Inventory No. 01, Inventory No. 02, etc.". For either of these levels, a functional location may be present, with finer granularity found at the inventory level, and coarsest granularity at the zone level, for this example.

The functional location module 306 may correlate the functional location to a layout mapping for the physical assembly operation to produce a system data type 310. The correlation with the layout mapping may be based on a grid layout-technique, a column-number layout-technique, a GPS-coordinate technique, etc.

The aggregated point solution module 312 including instructions that, when executed by the processor 204, cause the processor 204 to compare the each of the plurality of system data types 310 with a respective system data type threshold 314 to produce a status result. When the status result indicates an unfavorable comparison with the respective system data type threshold 314, the aggregated point-solution module 312 generates visual indicator data 140 for the status result. Generally, an unfavorable comparison operates to indicate an abnormality in the assembly operation. Examples may include equipment breakdown and/or malfunction, missed preventative maintenance, attendance issues, safety issues, quality issues, etc.

The aggregated point-solution module 312 may operate to present the visual indicator data 140 for display via the layout mapping at the functional location, such as via a graphical user interface 400.

Figure 4:
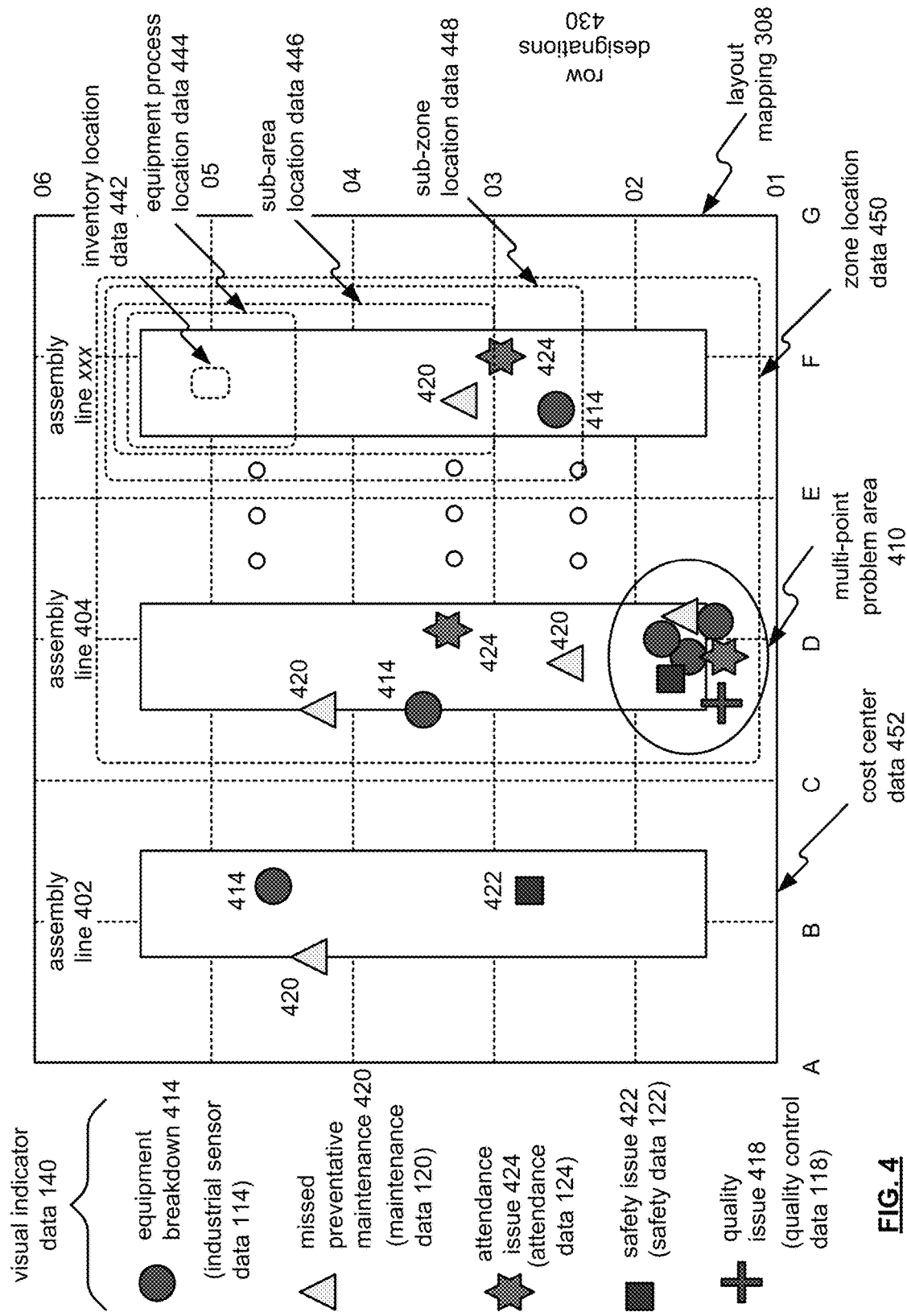
FIG. 4 illustrates an example graphical user interface for graphically displaying a layout mapping of an assembly operation.

FIG. 4 illustrates an example graphical user interface 400 for graphically displaying a layout mapping 308 of an assembly operation. In this respect, the functional location of visual indicator data to a layout mapping for the physical assembly operation to produce a system data type 310. The layout mapping 308 includes representations for an assembly line 402, an assembly line 404, through an assembly line xxx. Various assembly lines may be presented for monitoring and evaluating a plurality of system data types 110 (FIG. 1) relating to the assembly operation represented by the graphic user interface 400. The graphical user interface may include a visual indicator data 140, which indicates abnormalities based on the plurality of system data types 110. For example, the visual indicator data 140 may indicate equipment breakdown 414 based on industrial sensor data 114, missed preventative maintenance 420 based on maintenance data 120, attendance issue 424 based on attendance data 124, safety issue 422 based on safety data 122, quality issue 418 based on quality control data 118, etc. As may be appreciated further various point-solution contexts may be graphically illustrated by the graphical user interface 400 as desired by a user.

The correlation with the layout mapping 308 with the visual indicator data 140 may be based on a grid layout-technique, a column-number layout-technique, a GPS-coordinate technique, etc. The example of FIG. 4, an example of a grid layout is shown, having a row designation 430 that includes rows 01 through 06, and a column designation 432 having columns A through G.

The functional location for each of the plurality of system data types 110 (FIG. 1) may be identifiable within the a respective system data type (such as data types 114, 120, 124, 122, 118, etc.), or may be determined or discerned from other data types. For example, industrial sensor data 114 may have a functional location for a piece of equipment for the assembly operation. Attendance data 124 may generally not have a position identified with the an individual (for example, the title of the individual may be based on product cost center at the coarsest level, or may have specialized training for operation the a piece of equipment. The functional location for an individual may then be determined as co-located with the functional location for the piece of equipment.

Accordingly, the functional location gradients may be based on inventory location data 442, equipment process location data 444, sub-area location data 446, sub-zone location data 448, zone location data 450, and cost center data 452 for the plurality of system data types 110. For clarity, the example functional location gradients are provided as a single example, with the understanding that the functional location classification for an assembly operation may be greater in complexity than that shown in FIG. 4.

The granularity levels for the several location may be tailored to the plurality of system data types 110 and the finest levels and the coarsest levels based on the nature of the data types. As may be appreciated, component and/or tool inventories may have the finest granularity level because the functional location relates to specific coordinates relative to the layout mapping 308 (such as an (x,y) coordinate). On the other hand, an individual attendance data may have the coarsest granularity level because the functional location may generally relate to cost center data 352 when no further information may be available to the individual's function or roll in the assembly operation.

As shown in FIG. 4, the visual indicator data 140 is presented for display via the layout mapping at the respective functional location to convey an aggregated point-solution display based on the plurality of system data types 110.

As noted, the plurality of system data types 110 may be used to generate a point solution, in that individual abnormalities in an assembly may be addressed on an isolated and/or individualized basis. That is, resolving one particular abnormality may be addressed without regard to other abnormalities that may otherwise be related. Because of a lack of interrelationship between the different system data types 110, repetitive effort, time and finding resources may be used in addressing point solutions sequentially. By determining an interrelationship based on functional locations, such an interrelationship may be determined, and an efficient use of resources may be accomplished to expedite issues with the assembly operation, instead of piecemeal addressing of multiple issues.

For example, the graphical user interface 400 presents a multi-point problem area 410 with multiple abnormalities. Though the functional location of each abnormality of a respective the system data type 110 may have different granularity levels, a pattern may be discerned regarding the location(s) of the layout mapping of the abnormalities.

For the example of FIG. 4, a multi-problem area 410 may be discerned that may include numerous equipment breakdowns 414, an attendance issue 424, a missed preventative maintenance 420, and a quality issue 418. In this respect, the aggregated point-solution mapping demonstrates issues extending beyond singular point-solutions, and may be simultaneously addressed.

Figure 5:
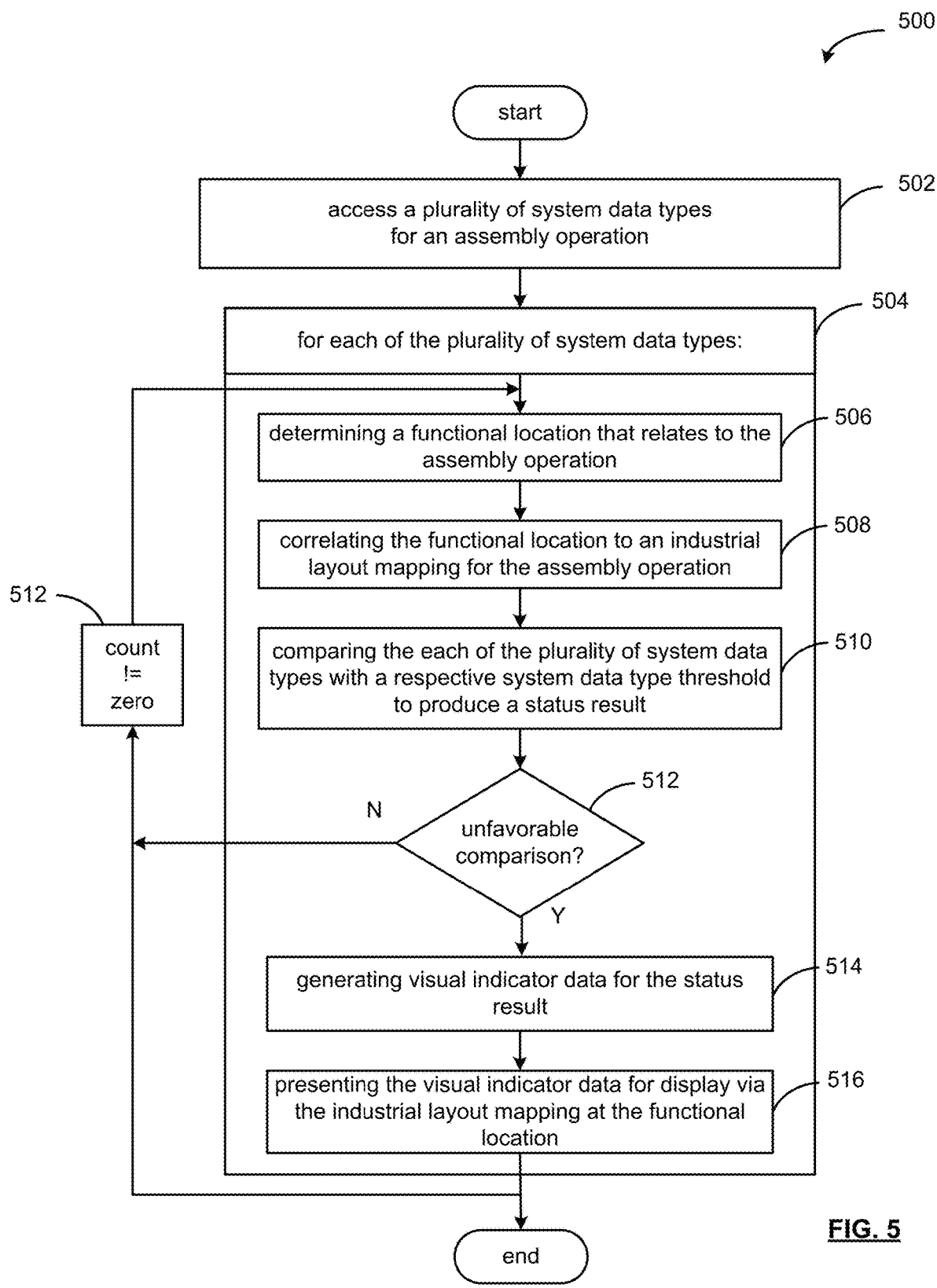
FIG. 5 illustrates an example process for an aggregated point-solution mapping for an assembly operation.

FIG. 5 illustrates an example process 500 for an aggregated point-solution mapping. As may be appreciated, the example process 500 may be executed periodically or based on a trigger event (such as addition or modification of data, or addition of a system data type, etc.).

At operation 502, the process 500 accesses a plurality of system data types for an assembly operation. At operation 504, for each of the plurality of system data types, determine at operation 506 a functional location that relates to the assembly operation, and correlate at operation 506 the functional location to a layout mapping for the assembly operation.

Each of the system level data 110 (FIG. 1) may include a related functional location tree. For example, a functional location tree for vehicle maintenance data may include a zone levels labeled "MTC-ASSY-TRIM1" "MTC-ASSY-TRIM2," etc. Each zone level may include an equipment process level labeled "Equipment1, Equipment2, Equipment 3, etc." Each of the equipment process levels may include an inventory (or asset) level labeled "Inventory No. 01, Inventory No. 02, etc.". For either of these levels, a functional location may be present, with finer granularity found at the inventory level, and with coarsest granularity at the zone level, for this example. Other system data types may have different database structures, yet some may correspond with one another to produce a functional location relating to the data types.

The functional location to a layout mapping for the physical assembly operation may be correlated with the layout mapping may be based on a grid layout-technique, a column-number layout-technique, a GPS-coordinate technique, etc.

At operation 510, each of the plurality of system data types are compared with a respective system data type threshold to produce a status result. When, at operation 512, the status result indicates an unfavorable comparison, generate visual indicator data for the status result at operation 514, and present the visual indicator data for display via the layout mapping at the functional location at operation 516.

Generally, an unfavorable comparison operates to indicate an abnormality in the assembly operation. Examples may include equipment breakdown and/or malfunction, missed preventative maintenance, attendance issues, safety issues, quality issues, etc. Though the functional location of each abnormality of the system data types may have different granularity levels, a pattern may be discerned regarding the location(s) of the layout mapping of the abnormalities.

The process 500 continues for each of the plurality of system data types, as indicated by the counter 518.

In this respect, an aggregated point-solution mapping may be presented in view of the functional location determinations of the method and device as described herein.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares unfavorably," as may be used herein, indicates that a comparison between two or more elements, items, signals, et cetera, provides an undesired relationship.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The foregoing description relates to what are presently considered to he the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method comprising:
accessing a plurality of system data types generated by an assembly operation, each of the plurality of system data types being different from one another and including non-locational data;
for each given system data type of the plurality of system data types:
searching other system data types of the plurality of system data types for information to discern functional location data from the given system data type,
determining a functional location for a piece of equipment that relates to the assembly operation based on the functional location data,
correlating the functional location to a layout mapping for the assembly operation;
comparing each of the plurality of system data types with a respective system data type threshold to produce a status result; and
when the status result indicates an unfavorable comparison:
generating visual indicator data for the status result, and
presenting the visual indicator data for display via the layout mapping at the functional location,
wherein the plurality of system data types comprises one or more of maintenance data, safety data, attendance data, and wireless data via network connected devices.

2. The method of claim 1, wherein the plurality of system data types relates to an industry operation.

3. The method of claim 1, wherein the functional location comprises at least one of:
sub-area location data;
sub-zone location data;
zone location data; and
cost center data.

4. The method of claim 1, wherein the determining a functional location further comprises:
retrieving a functional location tree respective to each of the plurality of system data types;
determining a plurality of location granularity levels of the functional location tree; and
searching the plurality of location granularity levels of the functional location tree for the functional location for each of the plurality of location granularity levels.

5. The method of claim 4, wherein the determining the functional location further comprises:

finding the functional location being relative to a location granularity level having a greater granularity value with respect to the plurality of system data types.

6. The method of claim 5, wherein the functional location for a first functional location tree is co-located with a second functional location tree.

7. A method comprising:
accessing a plurality of system data types relating to an assembly operation, each of the plurality of system data types including a data structure differing from one another and including non-locational data;
for each given system data type of the plurality of system data types:
searching the data structure of other system data types of the plurality of system data types for information to discern functional location data from the given system data type that relates to the assembly operation,
determining a functional location for a piece of equipment that relates to the assembly operation based on the functional location data, and
correlating the functional location to a layout mapping for the assembly operation;
comparing each of the plurality of system data types with a respective system data type threshold to produce a status result; and
when the status result indicates an unfavorable comparison:
generating visual indicator data for a point solution relating to the status result, and
presenting the visual indicator data for display via the layout mapping at the functional location to convey an aggregated point-solution display based on the plurality of system data types,
wherein the plurality of system data types comprises one or more of maintenance data, safety data, attendance data, and wireless data via network connected devices.

8. The method of claim 7, wherein the functional location comprises at least one of:
sub-area location data;
sub-zone location data;
zone location data; and
cost center data.

9. The method of claim 7, wherein the determining a functional location further comprises:
retrieving a functional location tree respective to each of the plurality of system data types;
searching a plurality of location granularity levels of the functional location tree; and
searching the plurality of location granularity levels of the functional location tree for the functional location across each of the plurality of system data types.

10. The method of claim 9, wherein the determining the functional location further comprises:
finding the functional location being relative to a location granularity level having a greater granularity value with respect to the plurality of location granularity levels.

11. The method of claim 10, wherein the functional location for a first functional location tree is co-located with a second functional location tree.

12. A device for aggregated point-solution mapping, comprising:
a communication interface to service communication with a network;
a processor communicably coupled to the communication interface; and
a memory communicably coupled to the processor and storing:
a functional location module including instructions that, when executed by the processor, cause the processor to:
access a plurality of system data types relating to an assembly operation, each of the plurality of system data types being different from one another and including non-locational data; and
for each given system data type of the plurality of system data types:
search other system data types of the plurality of system data types for information to discern functional location data from the given system data type,
determine a functional location for a piece of equipment that relates to the assembly operation based on the functional location data, and
correlate the functional location to a layout mapping for the assembly operation; and
an aggregated point solution module including instructions that, when executed by the processor, cause the processor to:
compare each of the plurality of system data types with a respective system data type threshold to produce a status result; and
when the status result indicates an unfavorable comparison:
generate visual indicator data for the status result, and
present the visual indicator data for display via the layout mapping at the functional location,
wherein the plurality of system data types comprises one or more of maintenance data, safety data, attendance data, and wireless data via network connected devices.

13. The device of claim 12, wherein the plurality of system data types relate to point solutions.

14. The device of claim 12, wherein the functional location comprises at least one of:
sub-area location data;
sub-zone location data;
zone location data; and
cost center data.

15. The device of claim 12, wherein the determining a functional location further comprises:
retrieving a functional location tree respective to each of the plurality of system data types;
determining a plurality of granularity levels of the functional location tree; and
searching the plurality of location granularity levels of the functional location tree for the functional location for each of the plurality of system data types.

16. The device of claim 15, wherein the determining the functional location further comprises:
finding the functional location being relative to a location granularity level having a greater granularity value with respect to the plurality of location granularity levels.

17. The device of claim 16, wherein the functional location for a first functional location tree is co-located with a second functional location tree.

* * * * *